United States Patent Office 3,442,942
Patented May 6, 1969

3,442,942
FLUORINATED OXYGEN CONTAINING ACYL FLUORIDES
Dario Sianesi, Adolfo Pasetti, and Constante Corti, Milan, Italy, assignors to Montecatini Edison S.p.A., Milan, Italy, a corporation of Italy
Filed Apr. 7, 1965, Ser. No. 446,292
Claims priority, application Italy, Apr. 9, 1964, 7,678/64
Int. Cl. C07c 53/36, 53/14, 53/34
U.S. Cl. 260—544                                             1 Claim

ABSTRACT OF THE DISCLOSURE

Novel fluorinated linear polyethers. Preparation thereof by photochemical reaction in liquid phase of perfluoroolefin with oxygen in presence of ultraviolet radiation.

---

Our invention relates to new products consisting essentially of carbon, fluorine and oxygen atoms, to the process for preparation thereof and to a new method for the preparation of epoxides of perfluoroolefins.

The chemical and thermal resistance is one of the most appreciated characteristics of fluoroorganic compounds which contain a high percentage of combined fluorine in their molecules. Because of their assembly of other favorable chemiphysical properties, the fluorinated compounds are of great interest and have found numerous useful applications. For many of these applications, fluorinated substances containing unsaturation, radicals or chemically reactive functions, e.g., double bonds, carboxyl groups and their derivatives, carbonyl groups, etc., in their molecules, are highly desired. These reactive constituents permit various subsequent transformations of these molecules, which determine their particular chemiphysical characteristics and make possible their chemical interaction with ether molecules.

For other applications, e.g., those inherent to heat transfer, lubrication under particular conditions, electric insulation, high molecular weight fluorinated compounds which are liquid over a wide range of temperatures, having a rather limited vapor pressure and possessing the characteristics of chemical and thermal stability in a high degree, are required. For these and other applications, the perfluorinated products, i.e., products which do not contain considerable amounts of elements other than carbon and fluorine and above all do not contain hydrogen in their molecule, are highly suitable. The perfluorinated products, in fact, generally possess the highest characteristics of chemical inertia and often of thermal stability.

It is known that fluorinated and perfluorinated products having a rather high molecular weight can easily be obtained by polymerization and copolymerization of fluoro- and perfluoroolefins. Usually, however, the products thus obtained are high polymers having the appearance and the characteristics of solid substances, both at room temperature and/or at rather higher temperatures. They are as such unsuitable for most of the applications referred to above, for which it is necessary to have products having a low volatility but being liquid at room temperature and within a wide range of temperatures.

Attempts have been made to obtain from the fluoroolefins, high molecular weight fluorine-containing products possessing these characteristics, by telomerization reactions. By this type of reaction, for which exists considerable literature known to those skilled in the art, various products became available which, as to chemical structure, do not differ from the general formula $X(A)_nY$, wherein X and Y are atoms or atom groups derived from the telogenic agent XY employed, A is a combined unit of the fluoroolefin and $n$ is an integer between 1 and 100.

The telomers that can be obtained from the fluoroolefin and particularly those deriving from fluoroethylene, which in practice are the only ones that can be obtained rather easily, however, show a considerable drawback which hinders their use for many of the desired applications. The molecules of the telomers consist essentially of a regular sequence of equal (A) units bound one to one other by carbon to carbon bonds. This gives the molecules a considerable rigidity and a high tendency to crystallize. It is also known that rotation around the C—C bonds is hindered by a strong energy barrier, in contrast to that which occurs with the C—O bonds. C—O bonds have a considerable freedom of rotation. It is also known that the linearity and regularity of structure of the macromolecules considerably promote the crystallization process. Consequently, when a telomer of for example a fluoroethylene has a value $n$ sufficiently high to make its vapor pressure negligible or limited, it is normally a solid or a wax at room temperature. When the telomer is brought to the molten state by heating, it generally becomes a highly volatile liquid, having a low viscosity and a high variation of viscosity with temperature, and is therefore unsuitable for the most part of the desired applications.

Another method for the preparation of liquid fluoro-, and particularly perfluoro-, compounds consists in the transformation of hydrocarbon compounds into the corresponding fluorocarbon compounds by means of fluorinating reactions. This method, however, is very complex, limited in its applicability and very expensive, as it requires elementary fluorine and complicated electrochemical fluorination processes. Moreover, it barely yields perfluoro compounds of high molecular weight, so that the liquid fluorinated products thus obtainable were in practice useless.

For these and other reasons, the problem of making easily available compounds with a high combined fluorine content, practically not containing hydrogen in the molecules, liquid at room temperature and in a wide range of temperatures, stable to the action of heat, chemical agents and solvents, having good dielectric, viscosity and lubrication characteristics, had not been solved.

A simple and suitable process yielding fluorinated products having a molecular weight varying within wide limits, containing practically no hydrogen in their molecules, stable to the action of heat and of the usual solvents and containing reactive functional groups, and therefore suitable for a great number of transformations, had not been known. Nor were products consisting only of carbon, fluorine and oxygen atoms possessing the above-mentioned characteristics known.

We have found, however, that it is possible to obtain products having the above-described characteristics by means of direct reaction of one or more perfluoroolefins with molecular oxygen under suitable conditions. Stable products having a very high molecular weight and containing only carbon, fluorine and oxygen atoms in their molecules, can now be obtained according to the present invention by means of direct reaction of one or more perfluoroolefins with molecular oxygen or with a gas containing oxygen, by operating in a liquid phase, at temperatures between −100° and +25° C., under a pressure between 0.1 and 10 atm. and preferably under about atmospheric pressure, in the presence of ultraviolet radiations.

The present invention is concerned therefore with a process for the preparation of epoxides of perfluoroolefins and of new products containing only C, F and O atoms with the general formula:

R—(—M—O—R)$_p$—(—M—O—O—)$_q$—R' wherein M is a unit derived by opening the double bond of one or more perfluoroolefins, O is an atom of oxygen, R and R' are the same or different acid groups selected from the group comprising and

$p$ is an integer, $q$ is zero or an integer, the sum of $p+q$ varies from 1 to 100 and the number of oxygen atoms per unit of combined perfluoroolefin varies from 1 to 1.3, the different (—M—O—) and (—M—O—O—) units being distributed at random along the polymer chain. A perfluoroolefin containing at least 3 carbon atoms or a mixture of perfluoroolefins in liquid phase is subjected to a photochemical reaction with molecular oxygen at a temperature between −100° C. and +25° C., at a pressure between 0.1 and 10 atm. and preferably between 0.2 and 5 atm. and a temperature of from −80° to 0° C., under an ultraviolet (U.V.) radiation, wherein the radiations used have a wavelength (a) between 1000 and 4000 A., and preferably prevailingly a wavelength above 2600 A., or (b) a wavelength lower than 2600 A., whereby a product having an oxygen content of 1.3–2 atoms per combined perfluoroolefin unit is obtained, which is then subjected to further U.V. radiation of wavelength according to (a) or to heaing up to 400° C. or to both.

The new class of products according to this invention has the formula

R—(—M—O—R)$_p$—(—M—O—O—)$_q$—R' wherein M is a unit derived from the opening of the double bond of one or more perfluoroolefins, O is an oxygen atom, R and R' are the same or different radicals that are selected from the group comprising and in which R'' is selected from the group formed by F, —OH, —OR'''$_{1/m}$, —NH$_2$ and an alkoxy group, R''' is a metal having the $m$ valency, $p$ and $q$ are integers from zero to 100, but both may not be zero at the same time and the sum of $p+q$ varies from 1 to 100, the different (—M—O—) and (—M—O—O—) units being distributed at random along the polymer chain, and the decarboxylation products thereof.

Though the above general formula more clearly defines the structure of the new products obtained according to the process of this application, for the sake of simplicity a general formula of the type (MO$_x$)$_n$ wherein M has the same meaning as above, i.e., as a unit derived from one or more starting fluoroolefin, $n$ is the average number of perfluoroolefin units combined in a molecule, and $x$ is a number that varies from 1 to 2, will be used. When the value of $n$ is sufficiently high, so that the variation in the percent composition caused by the presence of the terminal acid groups becomes negligible, $x$ gives an immediate indication of the ratio between the peroxy groups, for example of the type C—O—O—C, and of the ether groups C—O—C contained in the molecule. This ratio is in effect given by the expression $x-1/2-x$, wherein $x-1$ and $2-x$, respectively, represent the average values of peroxy and ether bridges associated with each unit of combined fluoroolefin.

We have found that regarding the chemical composition of the product obtainable by reaction of one or more perfluoroolefins with molecular oxygen, the type of U.V. radiation used for promoting the same reaction plays a role of fundamental importance. By varying the type of U.V. radiation, it is possible to obtain reaction products having different oxygen content wihch can be varied as desired. As type of radiation we mean the distribution and the relative intensity of the radiations having different wave lengths which, all together, form the U.V. radiation present in the reaction vessel.

According to our invention, if the photochemical reaction between oxygen and one or more perfluoroolefins is carried out under the action of U.V. radiations having a wave length comprised between 1,000 and 3,000 A., and preferably between 1,800 and 2,600 A., and in the absence of noticeable proportions of radiations having a wave length higher than 3,000 A., the reaction product consists mainly of compounds having the general formula (MO$_x$)$_n$ in which $x$ has a value of z or very near 2.

If on the other hand the U.V. radiation used for activating the reaction, contain remarkable proportions of radiations having a higher wave length, e.g., comprised between 2,600 and 4,000 A., the reaction products consist mainly of compounds having the general formula (MO$_x$)$_n$ in which the value of $x$ is lower than 2. When more intense radiations are used, those having lower energy (namely having a wave length higher than about 3,000 A.) result in the value $x$ more closely approaching 1. It is therefore clear that, by suitably varying the U.V. light source used for activating the reaction or by varying the spectrum of the radiations introduced into the reaction vessel in which the combination between the perfluoroolefin or perfluoroolefins with oxygen takes place, the chemical composition of the polymeric products obtainable can be varied as desired between the formula (MO$_z$)$_n$ and the formula (MO)$_n$.

Without pretending to formulate a hypothesis for the mechanism of this reaction, it is our opinion that the high energy radiations, such as those having a wave length between 1,800 and 2,600 A., activate the combination of oxygen with the perfluoroolefin or perfluoroolefins in the form of a true copolymerization.

In case of perfluoropropylene, this would lead, e.g., to the formation of chains of the type:

which grow by continuous alternating combination of perfluoropropylene and of oxygen. As the result of this reaction, we obtain therefore a polyperoxide having the general formula $(C_3F_6O_2)_n$ and a polymerization degree $n$ which can also be higher than 100 and in which the terminal groups contain COF functions.

The action of the lower energy radiations, having a wave length, e.g., comprised between 3,000 and 4,000 A, would cause a modification in the aforementioned polymeric chains by decreasing the average number of combined oxygen atoms per unit of fluoroolefins. For instance, in case of perfluoropropylene this would lead to the formation of compounds having a limit structure consisting of periodic —O—$CF_2$—CF($CF_3$)— units and acid groups as chain terminals. Besides these products, a certain amount of the epoxide of the perfluoroolefin used is also obtained.

This modification (thereby as the limit from a polyperoxide one passes to a pure polyether) is possible either during the same synthesis, namely by using U.V. radiations of a widened spectrum, or after the synthesis, namely by subjecting the previously prepared polyperoxide to the action of radiations of a suitable energy.

This opinion, which obviously has no binding value in respect of the present invention, is justified by what is observed in the photochemical oxidation of perfluoropropylene. By passing a molecular oxygen flow through a liquid perfluoropropylene phase kept at a temperature between —80° C. and —40° C., irradiated by means of an U.V. radiation source consisting of a low pressure mercury vapors generator (whose emission spectrum does not comprise remarkable amounts of radiations having a wave length higher than 2,600 A.), a progressive absorption of the same oxygen is observed.

By stopping the reaction after a certain time and distilling off the unreacted perfluoropropylene, a liquid substance having a very high viscosity, a very high molecular weight, e.g., of the order of $10^3$ or $10^4$, and a composition exactly corresponding to the formula $C_3F_6O_2$, was obtained as the reaction product. This substance appeared to be insoluble in the usual organic solvents, but soluble or miscible in all ratios with various fluorinated and in general halogenated liquids, such as perfluoropropylene, perfluorocyclobutane, perfluorodimethylcyclobutane, trifluorotrichloroethane, etc. The presence of functional acid groups of the type COF was determined both by acidimetric titration and by the presence of the corresponding bonds in the infrared absorption spectrum.

The peroxidic composition appeared evident from the fact that this compound releases substantial iodine amounts by contact with solutions of alkaline iodides, e.g., in acetic anhydride. A sample of this product was subjected, either in the pure state or in solution, e.g., in perfluoropropylene, to the action of U.V. radiations having a wave length comprised between 1,800 and 4,000 A. We found that it was gradually transformed with a decrease in its combined oxygen content and in its oxidizing power to reach as a limit the composition $C_3F_6O$. This composition corresponds to that of a polyether of perfluoropropylene in which the presence of peroxidic groups is no longer detectable, but which still contained acid functions at the end of the chains. In this way, by graduating the time of this treatment, compounds having the composition $(C_3F_6O_x)_n$ in which the value of $x$ can be varied, as desired, in the range between 2 and 1, have been obtained.

Analogous compounds have been obtained directly in the synthesis by using U.V. radiation of a suitable spectrum to activate the reaction between perfluoropropylene and oxygen. For instance, by using the source of U.V. radiations a high pressure mercury vapors generator producing radiations having wave lengths comprising 1,800 and 4,000 A., products having the composition $(C_3F_6O_x)_n$ in which $x$ has a value which can be higher than 1, but is always lower than 2, namely products containing at the same time ether and peroxy bridges, have been obtained. The oxygen content of these products appears to be variable as a function not only of the particular emission spectrum of the U.V. source used but also of the time of further action of the radiations onto the product already formed.

If compounds having, e.g., the composition $$(C_3F_6O_{1.2})_n$$

obtained by action of oxygen onto liquid perfluoropropylene irradiated with a given U.V. light source, are subjected to a further irradiation with the same source of radiations but in the absence of oxygen, they undergo a progressive modification of their composition, namely a progressive decrease in their content of combined oxygen. We have also found that not only the U.V. radiations but also the action of heat can profitably be used to transform products having a given content of combined oxygen into products having a lower oxygen content and therefore a lower number of peroxidic groups in the chains.

It has in fact been found that, e.g., if liquid compounds obtained by photochemical reaction of oxygen with perfluoropropylene, having the composition $(C_3F_6O_x)_n$ in which $x$ is comprised between 1.1 and 1.9, are heated to temperatures varying from 50° to 400 °C., they are transformed into compounds having a lower oxygen content and, at the limit, by prolonging the treatment time or the heating temperature, into compounds having the composition of polyethers or perfluoropropylene. This treatment can be carried out under atmospheric pressure or under a pressure, higher or lower than atmospheric pressure, on the perfluorooxygenated substances in the pure state or on their solutions or suspensions.

It is therefore clear that, by the present process, from one or more perfluoroolefins (M), it is possible to obtain polymeric products having the composition $(MO_x)_n$, wherein $x$ can be 1, 2 or any value therebetween. This combined oxygen percentage can be varied as desired within the aforementioned limits by using a suitable U.V. radiation to activate the reaction between the perfluoroolefin or perfluoroolefins and oxygen or also by subjecting the same compounds to suitable treatments, such as, e.g., irradiation with U.V. radiations, heating and the combination of both. These treatments which reduce the content of combined oxygen in the form of peroxidic oxygen, can be carried out either on the compounds as directly obtained from the synthesis or on their derivatives, such as those obtainable by hydrolysis, salification, esterification, amidation and the decarboxylation of the COF groups as chain terminals. The products thus obtained present various characteristics which render them of a great interest for various possible applications. As it was ascertained, when the value of $x$ is 1 or approaching 1, in the compounds $(MO_x)_n$ (either as obtained from the synthesis or modified by conventional chemical operations in the nature of the terminal groups), the molecules do not contain remarkable amounts of peroxidic groups and the compounds have exceptional chemical and thermal stability characteristics.

For instance, if compounds of this type, derived from perfluoropropylene and having the composition $C_3F_6O_{1.1}$, are mixed with molten KOH at high temperatures (up to 300–350° C.), they are salified, the terminal acid groups are eliminated in the form of $CO_2$ and are transformed into neutral oily substances which are exceptionally resistant to the action of heat and of chemical reactants. They can be separated by distillation into fractions having a different average molecular weight and therefore a different value of $n$, which are characterized in having a boiling point between 100° C. under atmospheric pressure and 350° C. under 0.1 mm. Hg or above, and have a viscosity and density increasing regularly as the molecular weight increases.

These substances can find useful applications as fluids, resistant to the action of heat and of chemical reactants; as lubricants for exceptional conditions of use; as fluids for heat exchange, and dielectric insulation; as plastifiers and solvents for polymers and particularly for fluorinated polymers.

Compounds of this type, even those containing a large proportion of peroxidic groups, can find suitable uses, both as free acids and their derivatives, as surface active agents, impregnating agents for fibers, paper, fabrics, etc. to give them properties of oil- and hydrorepellency.

The products obtained according to the invention in which, on the other hand, the value of $x$ is 2 or approaching 2, have properties completely in agreement with their polyperoxidic nature. They decompose, even violently, under heat and have remarkable oxidizing properties. For instance, they oxidize hydroiodic acid to iodine. This reaction can represent a suitable method for a comparative determination of their peroxidic group content. These compounds can find application in the field of liquid propellents and in the other well known uses of peroxides.

The products according to the invention in which the average oxygen content is between 1 and 2 atoms per combined perfluoroolefin unit have characteristics which are intermediate between those of the polyethers and of the polyperoxides, i.e., the lower their oxygen content, the higher their thermal stability or conversely, the higher their combined oxygen content, the higher in general their oxidizing power and their chemical reactivity.

The products of the present invention have physical properties which vary between those of gaseous substances at room temperature and atmospheric pressure and those of liquid or semisolid substances having a high viscosity and a very low vapor pressure at ordinary temperatures. These new products have a molecular weight comprised within rather wide limits, which can also reach and exceed values in the order of 10,000 and which, therefore, puts at least some of these products in the group of the macromolecular substances.

Examples of perfluoroolefins which, according to the present invention, can be used, either alone or in admixture with one another, in the reactions with oxygen are: tetrafluoroethylene, perfluoropropylene, perfluorobutene-1, perfluorobutene-2 cis and trans, perfluoroisobutene, perfluoropentene-1, perfluorodecene-1, and generally the unsaturated linear or branched compounds having the general formula $C_nF_{2n}$, wherein $n$ is comprised between 2 and 20, and having the double bond in internal or end position. Reactions of the perfluoroolefins with oxygen do not lead to degradation products caused by breaking the double bond and consequent fragmentation by oxidation, but rather to the formation of a wide range of compounds of high and very high molecular weight, and were not known until now.

It is surprising that stable high molecular weight products containing oxygen can be formed by means of direct reaction of an unsaturated compound with molecular oxygen. Included within the present invention are perfluorinated olefins except for substituents which are positioned sufficiently far from the double bond as not to modify considerably said olefins, regarding chemical behavior, with respect to perfluorinated olefins. Examples of these olefins are the ω-hydro or ω-chloroperfluoroolefins having the general formula $X-(CF_2)_n-CF=CF_2$, wherein X is a hydrogen or a chlorine atom and $n$ is comprised between 1 and 20.

As will become clearer from the examples given further on, the products of the photochemical reaction between oxygen and one or more perfluoroolefins, carried out according to the present process, can have rather variable structure, appearance and properties also in relation to the particular perfluoroolefin(s) reacted and to the reaction conditions chosen. The reaction products are, however, generally substances having a molecular weight at least 16 units higher than that of the perfluoroolefin from which they derive, and can reach and exceed also values of the order of 10,000.

When using one or more perfluoroolefins of low molecular weight, as, e.g., $C_2F_4$, $C_3F_6$, $C_4F_8$, among the products obtainable by photochemical reaction with oxygen those of lower molecular weight can be gaseous substances at room temperature and atmospheric pressure. Among these substances, considerable amounts of epoxide of the starting perfluoroolefin(s) are generally present. The products of higher molecular weight are colorless liquid substances of oily appearance and normally having a practically continuous distillation curve. The boiling temperatures of these products are within rather wide limits, for example between 10° C. at atmospheric pressure and 350° C. at 0.1 mm. Hg. Furthermore, a fraction having a distillation temperature higher than 350° C. at 0.1 mm. Mg which has the appearance of a colorless, transparent and very viscous liquid, is often present. Generally the various fractions, which can be separated by distillation from the global product of the photochemical reaction of a perfluoroolefin with oxygen, have a medium molecular weight, a viscosity, and density continuously increasing with the boiling temperature. These fractions, however, show certain very similar chemical and physical characteristics which permit considering them, in certain aspects, as a series of homologous products, distinguishable by a different molecular weight.

From the point of view of their chemical structure, the products obtained by simultaneous reaction of two or more different perfluoroolefins with oxygen are rather complex. In this case, the chemical structure of the products is highly influenced by the composition of the starting mixture of perfluoroolefins and, since the perfluoroolefins can have different reactivities among them in the photochemical reaction with oxygen, by the degree of conversion reached.

A general characteristic of the products of our invention is the presence of functional groups having an acid character in their molecule. For the most part, these consist of acid fluoride groups, —COF. These groups reveal their presence, e.g., in the infrared absorption spectrum causing a characteristic absorption in the 5.25μ zone. Absorption bands in the 5.6μ zone are probably due to the presence of free —COOH carboxyl groups which are often present. The free carboxyl groups can easily be formed by hydrolysis of the —COF groups, by contact with moisture during the various treatments of the products. The presence of acid terminal groups in the products is also apparent from the behavior of said products which respect to reagents, such as water, bases, alcohols, amines etc. which, as it is known, chemically interact with them. The amount or the concentration of acid groups present in certain fractions of the products can be determined by means of various methods, e.g., by titration with alkali solutions or by means of infrared spectophotometry.

As will be better seen in the examples given further on, the higher the concentration of acid groups, in the liquid products obtained from a given perfluoroolefin by photochemical reaction with oxygen, the lower the boiling temperature of the fraction. Fractions of liquid products, such as those obtained, e.g., by photochemical reaction of $C_3F_6$ with oxygen, show equivalent weights determinable by acid-base titration, comprised between values of the order of $10^2$ and $10^4$ depending upon the boiling temperatures comprised between 20° C. at atmospheric pressure and 350° C. or more at 0.1 mm. Hg. In the infrared absorption spectrum of these fractions, besides the already cited absorption bands due to the presence of —COF and —COOH groups, other characteristic absorptions are present independent from the boiling temperature, and, therefore, from the molecular weight of these products. In particular, a wide absorption is present between 7.5 and 9.2μ, with a maximum at about 8.0μ. Other characteristic bands occur at 10.15–11.2–11.5–12.05–12.35 and 13.4μ.

In the products obtained by reacting mixtures of $C_2F_4$ and $C_3F_6$ with oxygen, according to this invention, other characteristic absorption bands are present, the position and intensity of which depend upon the initial composition of the mixture.

The photochemical reaction between one or more perfluoroolefins and oxygen is of a considerably general character. It is possible, in fact, to carry ont the reaction in the liquid phase, in the absence of any other compound not being the perfluoroolefin(s) and oxygen, or in the presence of a variety of liquid diluents. While the photochemical reaction between oxygen and perfluoroolefins can be carried out under very different conditions, it has, however, been observed that when these reaction conditions are suitably varied, considerable variations in the reaction rate and at the same time in the characteristics of the products obtained can be achieved. It has been observed that an increase of the average molecular weight of the products is generally obtained when using low reaction temperatures, high perfluoroolefin concentrations, in the reaction zone, and reduced radiation intensities. On the other hand, a lowering of the average molecular weight of the products is obtained when the reaction is carried out at higher temperatures with limited concentrations of the perfluoroolefins and with a high radiation intensity in the reaction zone.

The preferred reaction conditions are obtained by keeping the reacting perfluoroolefin(s) in the liquid phase and radiating said liquid phase by a source of ultraviolet light while feeding it with a gaseous stream of oxygen or air or some other gaseous oxygen-containing mixture, at a temperature which can be comprised between −100° C. and the boiling temperature of the liquid phase at the pressure adopted. In practice, this temperature can reach about 25° C. In order to simplify things, under these conditions one operates preferably at atmospheric or slightly higher pressure.

We have found it convenient to carry out the photochemical reaction between oxygen and perfluoroolefins in the presence of a liquid phase by adding another compound, which is liquid under the reaction conditions, to the reaction system. This diluent can be selected among various compounds which do not react considerably with oxygen under the selected radiation conditions and may or may not possess dissolving properties with respect both to the perfluoroolefin(s) used in the reaction or part or all of the reaction products. Compounds which can be suitable for these functions are, for example, the perfluoro compounds such as perfluorocyclohexane, perfluorodimethlcyclobutane, the perfluoroparaffins having the general formula $C_nF_{2n+2}$, wherein $n$ is, e.g., comprised between 3 and 12, perfluorocyclobutane, perfluorobenzene, the perfluoroamines such as tri-perfluorobutylamine, perfluoro-fatty acids having for example from 2 to 10 carbon atoms, the perfluoro-ethers having open or cyclic molecules such as for example perfluoropropylpyrane, and the oxygenated perfluoro-compounds which can be obtained according to the present process.

Furthermore, totally or partially chlorinated compounds such as carbon tetrachloride, chloroform, methylene chloride, methylchloroform, or chlorofluoro derivatives of methane, ethane, propane, such as $CF_3Cl$, $CF_2Cl_2$, $CFCl_3$, $CHF_2Cl$, $CHFCl_2$, $CF_2Cl$—$CF_2Cl$, $CFCl_2$—$CF_2Cl$, $CCl_3$—$CF_3$, $CF_2Cl$—$CH_3$, $CF_3$—$CFCl$—$CF_2Cl$, etc., can be used as reaction medium.

When the diluent, used in the reaction, has dissolving properties with respect to the perfluoroolefin(s) employed, the photochemical reaction with oxygen can be carried out most simply by sening a gaseous stream of oxygen, or an oxygen-containing gas, into a vessel containing the radiated solution of the perfluoroolefin(s) in the selected solvent kept at the temperature and pressure chosen for the reaction. If under these conditions, one or more of the components of the liquid phase have a considerable vapor pressure, it is convenient to use, on top of the reaction vessel, a reflux condenser kept at a low temperature so as to limit or to prevent completely all losses of high vapor-pressure compounds from the liquid phase, due to evaporation or entrainment with the oxygen or the other gases leaving the reactor. Under these conditions, the maximum reaction temperature is the temperature at which the vapor pressure of the solution reaches the pressure chosen for the system. By varying the solvent used and the concentration of the perfluoroolefin(s) in it, the photochemical reaction in the liquid phase can also be carried out at a temperature higher than the boiling temperature of the perfluoroolefin(s) to be reacted at the pressure adopted. Some diluents which can be used in the reaction, though being solvents of the perfluoroolefin(s) to be reacted, are not at all or only partially solvents of the reaction products. Diluents of this type are, for example, $CCl_4$, $CHCl_3$, $CH_2Cl_2$. In this case, the liquid reaction products are separated by separating as the reaction proceeds and can be continuously extracted from the reaction vessel. If feeding of an equivalent amount of the perfluoroolefin(s) together with the oxygen is simultaneously carried out, it is possible to carry out the photochemical reaction in the liquid phase in a completely continuous way.

The use of a liquid substance which is a solvent neither for the perfluoroolefin(s) nor for the reaction products is also contemplated. In this case, the reaction is preferably carried out by continuously sending into the radiated liquid phase a gaseous stream containing the perfluoroolefin(s) and the oxygen in the desired ratios and by continuously removing the liquid or gaseous reaction products from the liquid phase.

Various other devices, those relating to the use of activators, photosensibilizers, modifiers, regulators, etc., included, can be used for carrying out the process of the present invention.

Independent from the particular method chosen and from the particular perfluoroolefin(s) to be reacted with the oxygen, a great number of new compounds essentially consisting of C, F and oxygen atoms, which have as main characteristic a very high chemical and thermal resistance, and moreover contain functional groups of acid nature, can easily be prepared according to the reaction of this invention. These products consequently show particular properties and can be used for a great number of transformations and useful applications. When the molecular weight of these products does not exceed certain limits, for example about 1000, owing to the presence of acid groups they are soluble in water and alkali solutions. These products react with bases to form the corresponding salts, or with other organic products to yield various derivatives, e.g., with alcohols to form esters, with ammonia or amine to form amides, and generally show most of the reactions characteristic of perfluoroorganic acids. They can for example give the well known decarboxylation reaction, yielding the corresponding saturated or unsaturated compounds, when pyrolyzed under suitable conditions, both in the free form and in the form of alkali salts.

When the molecular weight of the products exceeds certain limits, for example about 1000, the acid character is less evident, because a longer part of the chain or residue of neutral character results to be bound to each acid group. the products, then in aqueous solution or suspension, especially when alkaline, have considerable surface active characteristics resulting in the formation of very stable emulsions.

The products of the present invention show solubility characteristics in the common organic solvents which depend upon their molecular weight. It has been found, for example, that only the fractions consisting of products of limited molecular weight are miscible in solvents like ethyl ether, toluene, carbon tetrachloride, acetone; the fractions of higher molecular weight, on the contrary, are completely immiscible in these and other solvents. Solvent miscible in all ratios at ordinary or lower temperatures with the whole range of products to be obtained according to the invention are the liquid perfluoro compounds, such as for example the cited perfluoroolefins, perfluorocyclobutane, perfluorodimethylcyclobutane, and generally the perfluorinated hydrocarbon-, acid-, ether-, amine-derivatives, etc. Various partially fluorinated compounds, such as $CF_2Cl_2$, $CF_2Cl-CF_2-Cl$, $CF_2Cl-CFCl_2$, $CF_3Br$, etc., also have good dissolving properties.

Solutions of the products according to this invention in one of the above-mentioned solvents can usefully be employed in all chemical and physical treatments of said products, because by lowering the viscosity of the liquid media, they favor the contact and therefore the exchange, substitution, combination reactions, etc., of the products with various liquid or dissolved reagents which normally are immiscible with them.

Some illustrative and not limitative examples of the invention follow, in which a quartz ultraviolet-ray lamp "Original Hanau" type Q–81 having a tubular form and a size of 245 x 20 mm. has been employed as source of ultraviolet radiations, unless otherwise specified. Said lamp has an absorption of 70 watt and generates a wavelength emission chiefly comprised between 2400 and 4400 A.

EXAMPLE 1

An apparatus is prepared consisting of a three-neck round bottom glass reaction vessel having a capacity of 1.5 liter and provided with a thermometer, a gas inlet dipping pipe reaching the bottom and connected with the atmosphere by means of a reflux condenser wherein a cooling mixture at −78° C. is put. The ultraviolet-ray lamp is introduced into the reaction vessel and by external cooling at −78° C., 1230 g. of pure perfluoropropylene are condensed in it. While maintaining the external cooling so as to keep the temperature of the liquid between −60 and −30° C., the U.V. lamp is switched on. By means of a circulation pump, a stream of anhydrous oxygen of 130 l./h. is sent through the inlet pipe dipping down to the bottom of the reaction vessel. The gas leaving the reaction vessel after having passed through the reflux condenser is washed with an aqueous KOH solution having a concentration of 20% and then collected into a 50 liter gasometer from which, after drying, the gas is once more picked up by the pump and recycled into the reaction. Oxygen, equivalent to that consumed in the reaction, is periodically fed to the gasometer.

After 28 reaction hours, about 75 Nl. (liters under normal conditions) of oxygen are absorbed and the reaction is stopped. The nonreacted perfluoropropylene and the reaction products having a boiling temperature less than 30° C. at room pressure are separately distilled and removed from the reaction vessel. 650 g. of a mixture containing 78 parts percent by weight of $C_3F_6$ and 19 parts percent of perfluoropropylene epoxide (B.P. −29° C.) are thus obtained.

The liquid reaction products amount to 650 g. and have the appearance of a colorless, transparent viscous oil. The products are distilled without reflux. The following fractions are thus obtained.

| Fraction | Distillation interval | Grams |
|---|---|---|
| a | 30–40° C./760 mm | 11 |
| b | 40–64° C./760 mm | 8.5 |
| c | 50° C./20 mm.–105° C./20 mm | 37 |
| d | 55° C./0.5 mm.–100° C./0.2 mm | 40 |
| e | 100° C./0.2 mm.–155° C./0.2 mm | 53 |
| f | 155° C./0.2 mm.–350° C./0.1 mm | 462 |
| g | Residue | 30 |

Fractions a, b and c, which are liquid, have a stinging odor and develop hydrofluoric acid fumes when exposed to moist air, are put together and dissolved in 300 cc. of 2 N KOH. The aqueous alkaline solution is repeatedly extracted with a total of 500 cc. of ethyl ether. The ether layer is washed, under stirring, with 100 cc. of $H_2SO_4$ having a concentration of 50%, dried with $Na_2SO_4$ and distilled on $P_2O_5$. After removal of the ether, 13 g. of fluoroxygenated products having a boiling point between 40 and 190° C. and an average equivalent acidimetric weight higher than 200 are obtained. After ether extraction, the alkaline solution is acidified by addition of 100 cc. of $H_2SO_4$ having a concentration of 98% and extracted with 500 cc. of ethyl ether. The ether solution is distilled on $P_2O_5$ and, after removal of the ether, 41 g. of a product consisting of fluorinated carboxyl acids are obtained, which have a distillation temperature comprised between 90 and 200° C. and equivalent acidimetric weights comprised between 164 and 900. These acids show considerable surface-active properties when introduced in low concentrations into a neutral or weakly alkaline aqueous medium. Fractions d and e are put together and the product is subjected to an accurate fractionation in a rectifying column while operating under a residual pressure of 10 mm. Hg. In this way, the fractions reported in Table 1 are separated. In the same table, data relating to density, viscosity, equivalent acidimetric weight and percentage composition determined on various fractions are reported.

TABLE 1

| Number of fractions | G. | Distillation interval (° C.) at 10 mm. Hg. | $d^{24}_{24}$ | Equivalent acidimetric weight [1] | Viscosity (centipoises) at 24° C. | Percentage composition | |
|---|---|---|---|---|---|---|---|
| | | | | | | C | F |
| 1 | 7.8 | 67.5–93.0 | 1.7877 | 497 | 6.4 | 20.62 | 64.1 |
| 2 | 8.2 | 93.0–114 | 1.8035 | | | | |
| 3 | 8.5 | 114–130 | 1.8260 | 1,044 | 11.0 | 20.86 | 67.0 |
| 4 | 7.3 | 130–140 | 1.8239 | | | | |
| 5 | 8.1 | 140–150 | 1.8342 | 1,477 | 15.5 | | |
| 6 | 7.8 | 150–157 | 1.8352 | | | | |
| 7 | 8.3 | 157–168 | 1.8380 | 2,640 | 22.9 | 21.12 | 68.0 |
| 8 | 8.0 | 168–180 | 1.8520 | | | | |
| 9 | 8.2 | 180–193 | 1.8517 | 2,832 | 32.3 | | |
| 10 | 8.1 | 193–208 | 1.8574 | | | | |
| 11 | 11 | 208–225 | 1.8684 | 3,150 | | 21.22 | 68. |

[1] The equivalent weights reported have been obtained by introducing about 0.4 g. of exactly weighed product into 25 cc. of 0.1 N NaOH keeping the whole in strong agitation for 2 hours at room temperature and titrating it back with 0.1 N HCl using phenolphthalein. In the thus neutralized solution, the F ions present were determined with thorium nitrate. The ratio between the weight in grams of the starting product and the difference between the number of acid equivalents of the product and the number of the equivalents of fluorine ions was considered as the equivalent acidimetric weight.

The infrared absorption spectra of the various fractions were all similar to each other, presenting absorption bands in the 5.25µ zone and in the 5.6µ zone, due to the presence of —COF and —COOH groups, respectively. The intensity of these absorption bands decreased for the various fractions as the boiling temperature increased. Other infrared absorption bands present in all the fractions occurred in the zones between 7.5 and 9.2μ and further at 10.15–11.2–11.5–12.05–12.35–13.4μ.

Solubility tests of the various fractions in ethyl ether have shown that, while fractions 1 and 2 can be mixed in all ratios with the solvent, fractions 10 and 11, on the contrary, are practically immiscible. The other fractions show an intermediate behavior.

All fractions are completely miscible in all the perfluorinated solvents examined.

Fraction $f$ has an average density $d_{24}^{24}$ of 1.8953 and an average equivalent acidimetric weight, determined in an aqueous NaOH solution in accordance with the above-described modalities, of about 4000. In fraction $f$ the following viscosities are determined at different temperatures:

| Temperature, °C | 24 | 30 | 40 | 50 |
|---|---|---|---|---|
| Viscosity, centipoises | 264 | 193 | 117 | 76 |

The infrared absorption spectrum of the product of which fraction $f$ consists showed, besides the presence of small absorptions in the zones of the —COF and —COOH groups, a wide absorption between 7.5 and 9.2μ with a maximum at about 8.0μ, and other characteristic absorptions in the 10.15–11.2–11.5–12.05–12.35–13.4μ zones.

A portion of 100 g. of product (fraction $f$) was slowly introduced, under stirring, into 100 cc. of an aqueous NaOH solution having a concentration of 30%. The white viscous mass thus obtained was repeatedly washed with water under strong stirring and then treated with 100 cc. of $H_2SO_4$ having a concentration of 98%, at 80–90° C. The oil separated was washed with water, separated and distilled. 75 g. of a rather viscous liquid product having a distillation interval comprised between 160 and 310° C. at 0.5 mm. Hg and an infrared absorption spectrum completely similar to that of the product before the hydrolysis treatment, was obtained, except that the absorptions due to the —COF groups had disappeared while the absorptions due to the —COOH groups proportionwise increased. The viscosity at 30° C., of the hydrolyzed product, was 320 centipoises.

Another hydrolysis operation was carried out by dissolving 10 g. of the product of fraction $f$ in 100 cc. of perfluorodimethylcyclobutane and treating said solution with 50 cc. of water, while stirring. The organic layer was separated, dried with $P_2O_5$ and distilled. 9 g. of hydrolyzed product having characteristics completely similar to those reported above were thus obtained. Small quantities of hydrolyzed product give rise by contact with water or alkaline solutions to the formation of very stable emulsions.

Samples of the product of fraction $f$ and samples of corresponding hydrolyzed products heated in the air to a temperature of 350–400° C. for long periods did not discolor, nor did they give significant symptoms of modification.

50 g. of the product of fraction $f$ were heated with 5 g. of KOH in the form of pellets for a period of 2 hours at a temperature of 240–250° C. at atmospheric pressure, in a 100-cc. flask which was part of a distillation apparatus. During this treatment, the development of carbon anhydride and water vapor were observed. At the end of this treatment, the contents of the vessel were subjected to vacuum distillation. About 40 g. of colorless, transparent oil having a boiling range between 120 and 200° C. at 0.2 mm. Hg were thus obtained. This product no longer showed an acid character, was completely indifferent towards water and alkaline solutions, and had an infrared absorption spectrum in which the absorptions due to the acid functions were completely absent.

The residual fraction $g$ had a viscosity of 24° C. higher than 2000 centipoises; a density $d_{24}^{24}$ of 1.9104 and showed an exceptional resistance to thermal treatments, both in the air and under high vacuum, without showing any symptom of modification after prolonged periods of heating at temperatures of about 400° C. The infrared absorption spectrum of this fraction was completely similar to that of the preceding fractions, except for the very low intensity of the absorptions corresponding to the acid groups.

Fractions $f$ and $g$ were miscible in any ratio with all the perfluorinated solvents examined, such as for example perfluorocyclobutane, perfluorotributylamine, perfluoropropylpyrane. They were, on the contrary, immisicble with the common organic solvents, such as for example acetone, ethyl ether, tetrahydrofurane, toluene, $CCl_4$, $CHCl_3$, $CH_2Cl_2$, dioxane, dimethylsulfoxide, dimethylformamide, ethyl acetate, etc.

EXAMPLE 2

The same apparatus as in Example 1 was prepared, except that a cylindrical glass vessel having a volume of 0.4 liter, in which the U.V.-ray lamp was contained, was used as reactor. 165 g. of perfluoropropylene and 200 cc. of perfluorocyclobutane were collected in the reaction vessel by distillation at —78° C. The reaction was started by passing through an oxygen stream of about 50 l./h. and by lighting the U.V.-lamp, at a temperature of —45° C. The reaction was continued for a period of 11 hours, during which the temperature of the liquid phase gradually rose until it reached —9° C. and totally about 18 N liters of oxygen were absorbed.

Finally, $C_4F_8$, the unreacted perfluoropropylene and the products having a boiling temperature lower than 25° C. at atmospheric pressure, were distilled off. The residue consisted of 95 g. of a liquid product which gave the following fractions when subjected to distillation:

| Fraction | Weight (g.) | Distillation Interval |
|---|---|---|
| B | 11.6 | 25–90° C./760 mm. Hg. |
| A | 20.3 | 90–160° C./760 mm. Hg. |
| C | 29.2 | 50–100° C./0.2 mm. Hg. |
| D | 15.2 | 100–150° C./0.2 mm. Hg. |
| E | 12.8 | 150–280° C./0.2 mm. Hg. |
| F | 3.0 | Residue. |

The products obtained, for the same distillation interval, showed characteristics equivalent to those of the products obtained in Example 1. The presence of a solvent during the reaction and also the higher radiation intensity resulted, as can be seen, in the formation of a product having a lower average boiling temperature.

EXAMPLE 3

Under the conditions of the preceding example, 135 g. of $C_3F_6$ and 340 g. of $CCl_4$ were reacted with oxygen. After 6 hours' radiation under continuous oxygen bubbling at temperatures comprised between —37° and —5° C., 7.5 liters of oxygen had been absorbed. The reaction was stopped and, after removal by distillation of the products volatile at room temperature, the two liquid layers resulted. The lower liquid phase (about 25 g.) was separated and gave fractions of products having boiling temperatures comprised between 40° C./760 mm. and 230° C./0.3 mm. when distilled. The upper liquid layer gave, after removal of $CCl_4$, 8 g. of liquid products containing only C, F and O and having boiling temperatures comprised between 80° and 210° C./760 mm. At the same boiling temperature, the products obtained showed characteristics completely equivalent to those of the products described in Examples 1 and 2.

EXAMPLE 4

A photochemical reaction between $C_3F_6$ and oxygen was carried out with conditions analogous to those of the preceding example, except that 275 g. of methylene chloride were used as diluent in lieu of $CCl_4$. After a 6 hour reaction, the two liquid layers present in the reaction medium were separated and distilled. Totally 28 g. of fluoroxygenated products were obtained, which had a distillation interval comprised between 45° C./760 mm. Hg and 250° C./0.6 mm. Hg and properties very similar to those of the products obtained in the preceding example.

EXAMPLE 5

An apparatus was prepared consisting of a cylindrical glass vessel having a capacity of 0.4 liter and provided with a thermometer and a gas inlet pipe dipping down to the bottom and connected with the atmosphere by means of a reflux condenser cooled at −78° C. and containing the ultraviolet-ray lamp. In this vessel, 460 g. of $C_3F_6$ were distilled at −78° C. and the photochemical reaction was started by radiation with ultraviolet light and by feeding of a stream of 60 l./h. of dry air to the liquid phase kept at −70° C. The air left the reactor and was removed after passage through the condenser at −78° C., which sent at least part of the entrained $C_3F_9$ back into the reactor. As the reaction proceeded, the temperature of the liquid phase rose gradually until it reached 25° C., after about 8 hours of reaction. The liquid product remaining in the reactor, 108 g., was distilled and separated into the following fractions:

| | | |
|---|---|---|
| A | 5 g. | 30–57° C./760 mm. |
| B | 11 g. | 45–98° C./18 mm. |
| C | 35 g. | 80–166° C./0.3 mm. |
| D | 90 g. | 166–260° C./0.3 mm. |
| E | 25 g. | Residue. | which have characteristics completely equivalent to those of the products described in Example 1.

EXAMPLE 6

An apparatus was prepared consisting of a cylindrical 0.4 liter glass reactor containing the ultraviolet-ray lamp, and provided with a thermometer, a gas inlet pipe dipping down to the bottom of the vessel, a gas outlet pipe provided with a reflux condenser cooled to −78° C., and an outer cooling bath. 380 g. of perfluoropropene were introduced into the reactor by distillation at low temperature. At a temperature of −70° C. and under ultraviolet radiation, the introduction through the inlet dipping pipe of 60 l./h. of an anhydrous gas consisting of 2 parts by volume of oxygen and 1 part by volume of tetrafluoroethylene was started. This gas was fed from a 150 liter gasometer by means of a circulating pump. The gas leaving the reactor through the reflux condenser was continuously recycled to the same gasometer, after washing with a KOH solution having a concentration of 20%. After 6 hours the reaction was stopped while the temperature of the liquid phase had gradually risen to −27° C. and a total of 52 liters of gas had been absorbed.

By heating at room temperature, 212 g. of unreacted $C_3F_6$ were removed from the liquid phase and 215 g. of liquid products were obtained from the reaction.

The following fractions were separated by distillation:

| Fraction | Weights (g.) | Distillation interval |
|---|---|---|
| a | 15 | 25–60° C./760 mm. |
| b | 9 | 47–105° C./20 mm. |
| c | 15 | 80–102° C./0.5 mm. |
| d | 22 | 102–154° C./0.5 mm. |
| e | 125 | 160–260° C./0.5 mm. |
| f | 26 | 260–305° C./0.5 mm. |
| g | 2 | Residue. |

Fraction $f$ shows a density $d_4^{24}$ of 1.8948 and a viscosity at 24° C. of 2990 centipoises, a value considerably higher than that of the fraction with analogous distillation interval obtained by photochemical reaction of oxygen with $C_3F_6$ only.

EXAMPLE 7

This example shows the possibility of directly obtaining a polyperoxide of perfluoropropylene by reacting the olefin with oxygen in the presence of U.V. radiations having a suitable spectrum. For this purpose a low pressure mercury-vapors quartz generator of the NK 6/20 Hanau type, having an emission spectrum containing a high percentage of radiations having a wave length than 2,600 A. and an absorption of 8 watt was used. This source of U.V. radiations, having a tubular shape and an outer quartz sheath, was completely immersed in 490 g. of liquid $C_3F_6$ placed in a 0.6 liter glass vessel provided with a dipping pipe for the introduction of oxygen, a reflux condenser kept at −78° C. and immersed in an outer cooling bath. A closed circuit was prepared for the circulation of molecular oxygen. By means of this circuit the oxygen withdrawn from a 10-liter gasometer by means of a circulating pump and dried, was fed to the reaction vessel and, when leaving the latter through the condenser at −78° C., was washed with an aqueous KOH solution and sent back to the starting gasometer. The reaction was started by keeping perfluoropropylene at a temperature comprised between −65° C. and −75° C. and by feeding through it an oxygen flow of about 50 liters/hour.

After 11 hours of reaction, 2.4 liters of oxygen had been absorbed. At this point, the reaction was stopped and the unreacted perfluoropropylene was removed from the reactor by distillation at −30° C. It contained about 0.3% of epoxide.

17.0 g. of a liquid-semisolid product were obtained as the residue which, by analysis, contained: C, 19.83%; F, 62.73%; O, 17.44%.

Figure 1:
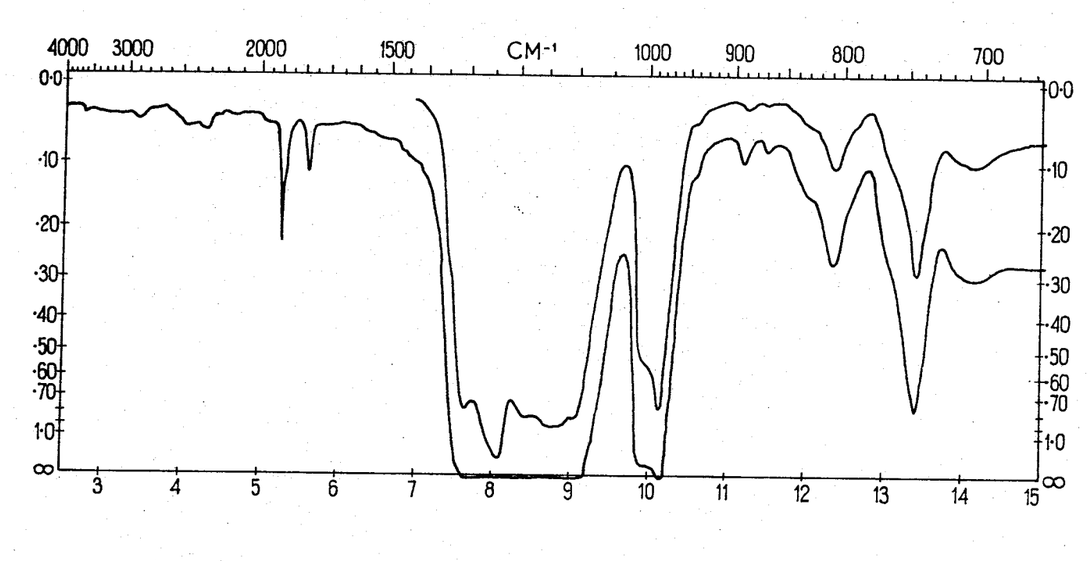
The drawing shows the infrared absorption spectrum of a polyperoxide of perfluoropropylene prepared according to Example 7.

These data practically correspond to the formula $(C_3F_6O_2)_n$. The infrared spectrum of this compound showed that —COF groups are present as shown by the presence of the characteristic absorption band in the zone at 5.25μ, as shown in the attached figure.

The presence and the amount of these acid groups is also shown by titration of the total acidity with cold alkaline solutions and determination of the fluoride ions thus hydrolyzed. The presence of peroxidic groups is clearly demonstrated by the fact that a sample of this product, titrated with an alkaline iodide solution, e.g., in acetic anhydride, releases substantial amounts of iodine. 200 mg. of this product are dissolved in 5 cc. of $CF_2Cl$—$CFCl$. 20 cc. of acetic anhydride containing 2 g. of potassium iodide are added to this solution. It is then stirred for a few minutes and titrated with 0.1 N thiosulfate; 19.95 cc. were used: this corresponds to 0.9 atom of active oxygen per $C_3F_6$ unit.

The polyperoxide of perfluoropropylene thus obtained was remarkably stable at room temperature. When heated in the pure state to a temperature above 70–80° C., it decomposed in a violent manner by developing gaseous or low-boiling products leaving practically no liquid residue.

More controllable decompositions of the polyperoxide can be carried out by operating on solutions of the compound in solvents such as perfluorodimethylcyclobutane, 1,1,2-trifluorotrichloroethane, etc.

Solutions of the polyperoxide in the cited solvents can be used for carrying out the usual transformation reactions of the terminal —COF groups, such as, e.g., the hydrolysis, esterification, salification, amidation reactions, etc., which make it possible to obtain a number of derivatives.

A solution of 10 g. of polyperoxide in 100 cc. of perfluorodimethylcyclobutane was irradiated, at a temperature of −25° C. to −10° C., with the aid of an immersed U.V. radiation source, consisting of a high-pressure mercury-vapors quartz generator of the Q 81 Hanau type, having an absorption of 70 watts. The energy spectral distribution of this generator was such that the ratio of the energy of the U.V. radiations emitted with a wave length higher than 3,000 A. to the energy of the radiations emitted with a wave length lower than 2,700 is 6.66:1. The irradiation was continued for 5 hours and during this time a slow dry nitrogen flow was bubbled through the liquid phase. At the end of the operation, the solvent was distilled off under reduced pressure and an oily product was recovered which had acid character and a percent composition corresponding to the formula $(C_3F_6O_{1.05})_n$.

This product was stable to heating and could be distilled up to about 300° C. under a pressure of 1 mm. Hg; the presence of peroxidic groups is not detectable in it. This shows that the action of suitable U.V. radiations makes it possible to transform a peroxidic compound into a stable compound having a lower oxygen content.

EXAMPLE 8

With the apparatus described in the preceding example, a photochemical reaction was carried out between liquid perfluoropropylene (525 g.) and molecular oxygen, by irradiation at a temperature of about −60° C. to −50° C. with the aforedescribed low-pressure mercury-vapors U.V. radiation source. After 18 hours, 2.65 N liters of oxygen were absorbed and the reaction was stopped. From the reaction apparatus, kept at −78° C. under anhydrous atmosphere, a 14 cc. sample of solution was withdrawn. By evaporating off $C_3F_6$, a polyperoxidic product completely similar to that described in the preceding example was obtained as the residue.

The high pressure mercury vapors U.V. generator described above was now immersed in the reactor and, while feeding a slow nitrogen flow to the solution at about −40° C., the solution was irradiated for 1 hour. A 23 cc. sample of solution was then withdrawn. After evaporating off $C_3F_6$ from this sample, an oily residue was obtained, which appeared to have a low peroxidic oxygen content and was already remarkably stable to heating up to temperatures of about 200° C.

This residue of the solution of the initial polyperoxide in perfluoroethylene was subjected to irradiation for further 6 hours and then perfluoropropylene was removed by distillation. As the new residue, 24 g. of a liquid having the following composition: C=21.69%, F=68.20%, O=10.11%, corresponding to the formula $(C_3F_{5.97}O_{1.05})_n$, were obtained.

This compound, by reaction with acid solutions of alkaline iodides, does not practically reveal the presence of peroxidic groups. In the infrared spectrum, the absorption bands of COF and COOH groups were present. By titration with alkaline solutions and by determination of the hydrolyzed fluoride ions, the average equivalent weight of about 2,400 was determined.

The compound is remarkably stable to heat, it can be distilled between 50° C. under atmospheric pressure and 250° C. under 1 mm. Hg. The distillation curve is of continuous type and the most consistent fraction is distilled between 80° C. and 110° C./1 mm. Hg.

EXAMPLE 9

Under the reaction conditions described in Example 1, but operating at the temperature of −29° C. and with a molecular oxygen flow of 20 liters/hour, a photochemical oxidation of 505 g. of perfluoropropylene was carried out for 22 hours. At the end of the reaction, by distillation of the unreacted olefin, 71 g. of a liquid acid product having a high viscosity at room temperature and a percent composition corresponding to the formula $(C_3F_6O_{1.6})_n$ were obtained. 300 mg. of this product were iodometrically titrated as described in Example 7: 18.85 cc. of 0.1 N of thiosulfate were used, which corresponds to 0.55 atom of active oxygen per $C_3F_6$ unit.

The product showed an acidimetric equivalent weight of 1000, as determined by prolonged agitation of a sample with a cold 0.1 N NaOH solution and a back titration of the unreacted alkali excess and of the hydrolyzed fluoride ions of the —COF groups. A sample of 10 g. of product, by gradual heating up to a temperature of 130° C. developed gaseous products and left, as the residue, 2.5 g. of a liquid, which was very stable to the further action of heat up to temperatures of above 350° C., and having a composition corresponding to the formula $(C_3F_6O_{1.06})_n$, which by treatment with acid solutions of alkaline iodides did not show any oxidizing property.

This example shows that, by varying some conditions in respect to those described in Example 7 (more particularly by increasing the irradiation time and the reaction temperature), it is possible to obtain products having an intermediate composition between that of polyperoxide and that of a polyether of perfluoropropylene.

EXAMPLE 10

This example shows that, by using a source emitting U.V. radiations with wide spectrum, and an experimental system, which makes it possible to quickly remove the reaction product from the reactor in which the photochemical reaction of perfluoropropylene with oxygen is carried out, it is possible to operate continuously. Polymeric perfluorooxygenated liquids which have higher oxygen content than a pure polyether having the formula $(C_3F_6O)_n$ were thus obtained. For this purpose, an apparatus was prepared which comprises the reactor as such, which was a 0.5 liter glass reactor containing a liquid phase of perfluoropropylene, in which the before-described Q–81 Hanau type high-pressure mercury-vapors U.V. radiation generator was immersed. A dipping pipe on the bottom of the reactor allows the introduction of an oxygen flow which then leaves the reactor, through a condenser kept at −78° C. The unreacted oxygen was washed with alkaline solutions and sent into a 50 liter gasometer from which, by means of a circulating pump, it was continuously reintroduced, after drying, into the photochemical reactor. The oxygen consumed in the reaction was periodically reintroduced into the cycle.

To the photochemical reactor, a perfluoropropylene flow was also continuously fed from a 50-liter gasometer by means of a circulating pump.

The level of the liquid phase in the reactor was maintained constant by a continuous discharge, through the bottom, of a corresponding liquid amount, which was sent to a continuous system of fractionated distillation. From this system, the olefin and the compounds, if any, boiling below 20° C., were sent back in the gaseous state to the gasometer and the liquid reaction products were collected separately. The reacted perfluoropropylene was periodically replenished in the cycle.

With the described apparatus, a reaction was carried out by initially introducing into the reactor, 600 g. of $C_3F_6$ and by feeding to it at the temperature of −35° C. to −30° C. an oxygen flow of 80–100 liters/hour and a perfluoropropylene flow of about 100 liters/hour. After 42 hours of reaction, 330 N liters of oxygen were absorbed and 2.850 g. of polymeric liquid products were obtained. The analysis of the residual $C_3F_6$ in the cycle showed that it contained 22.2% by weight of epoxide $C_3F_6O$, corresponding to a production of 190 g. of epoxide.

The liquid product obtained had the following average composition: C=21.14%; F=66.93%; O=11.93%; corresponding to the formula $(C_3F_6O_{1.27})_n$. This product released iodine by contact with acid solutions of alkali iodides and had a remarkable acid reaction. 500 mg. of this product were iodometrically titrated according to Example 7: 13.55 cc. of 0.1 N thiosulfate are used, which corresponds to 0.23 atom of active oxygen per $C_3F_6$ unit.

In the infrared absorption spectrum, the characteristic bands at 5.25μ due to the presence of —COF groups, are present. A weighed sample of product was reacted with a titrated aqueous alkali solution, while agitating. The alkali excess was titrated back with acids and in the neutral solution the amount of fluoride ions hydrolyzed by the —COF groups was determined. The product appears to have an acidimetric equivalent weight comprised between 1,300 and 1,400. These values obviously have only an orientative character due to the complex constitution of the liquid product mixture and to the difficulty of carrying out the titrations in a nonhomogeneous medium. These polymeric liquid products give in fact the corresponding salts by treatment with alkali solutions, some of which salts (those having a relatively low molecular weight) are soluble in water and some of which are insoluble and have the appearance of soaps, with strong emulsifying properties.

A sample of the product was distilled. About 30% of the product distilled at between 40° C. under atmospheric pressure and 175° C. under 1 mm. Hg. About 65% distilled at between 175° C. under 1 mm. Hg and 360° C. under 1 mm. Hg while the remaining 5% distilled only at higher temperatures. The infrared absorption spectra of the various fractions appear to be practically coincident, while it was observed that the acidimetric equivalent weight, the viscosity and density progressively increased as the boiling temperature of the mixture increased. The average composition of the fraction distilling between 175° C./1 mm. Hg and 360° C./0.1 mm. Hg corresponds to the formula $(C_3F_6O_{1.1})_n$.

A sample of 200 g. of the obtained product was irradiated at a temperature of 20–30° C. for 100 hours with a high-pressure mercury-vapors U.V. light source. During this treatment, a slow dry nitrogen flow keeps in agitation the liquid phase in which the U.V. lamp was immersed. At the end of this treatment, it was observed that the sample showed a 5% weight loss, while its average percent composition now corresponds to the formula $(C_3F_6O_{1.19})_n$. Although the oxidizing power of the product after irradiation becomes remarkably lower, the other characteristics, including the distillation curve, do not show remarkable changes.

Similar results had been obtained by subjecting a sample of the product to heating at the temperature of 380° C. for 30 hours, in an autoclave in which the pressure was kept below 40 atm. The product after this thermal treatment had a composition corresponding to the formula $(C_3F_6O_{1.15})_n$.

As described hereinbelow, from the acid products obtained as described above and having a certain content of peroxidic groups, by suitable treatments it is possible to obtain neutral products having a very high thermal and chemical stability. A treatment of this type can consist substantially of a neutralization with alkali and of thermal decomposition of the salts, thus eliminating the carbooxylic groups and most of the peroxidic bridges. 600 g. of KOH (85%) in the form of pellets were introduced into a 3-liter vessel provided with an agitator, a reflux condenser and a charging pipe. The vessel was heated to 100° C. and the slow introduction of the crude acid oil was started, while vigorously agitating. The temperature rose to 130–140° C. while within 6 hours the introduction of 2.0 kg. of fluoroxygenated product was completed. The salt formed was kept in agitation for further 24 hours at the temperature of about 140° C. By eliminating the circulation of water from the reflux condenser, the water contained in the vessel was then permitted to distill together with a small fraction of neutral low boiling fluoroxygenated oils while the inner temperature rose to 320–330° C. During this stage, the development of a remarkable amount of gas, mainly consisting of $CO_2$, was observed.

After a further period of 4 hours of heating to 300–320° C., the content of the reactor was cooled and the oil previously steam-distilled was added. All the liquid contained was then filtered to remove the solid salts prevailingly consisting of KF. In total, 1,350 g. of neutral fluorinated oils were obtained, which by distillation were fractionated into the fractions having the characteristics reported in the following table.

TABLE 2

| Fractions | Distillation range | G. | Composition | Average molecular weight |
|---|---|---|---|---|
| I | 50–100° C./1 mm. Hg | 460 | $C_3F_6O_{1.02}$ | 600–1,000 |
| II | 100° C./0.1 mm.–200° C./0.1 mm. | 555 | $C_3F_6O_{1.05}$ | 1,000–2,000 |
| III | 200° C./0.1 mm.–350° C./0.05 mm. | 300 | $C_3F_6O_{1.03}$ | 2,500–3,500 |
| IV | Residue | 30 | $C_3F_6O_{1.02}$ | >5,000 |

All these fractions have no oxidizing power and present an exceptional chemical stability. In the infrared absorption spectrum of these products the presence of bands characteristic of acid groups cannot be observed.

We claim:
1. Products of the formula:

$$R—(C_3F_6O_x)_n—R'$$

wherein $x$ varies from more than 1 to 2 and $n$ is an integer from 3 to 100, R and R' are radicals that are seelcted from the grouup consisting of and said product containing sequences of no more than two oxygen atoms, —O—O—.

References Cited

UNITED STATES PATENTS 3,125,599 3/1964 Warnell ________ 260—484 XR
3,250,806 5/1966 Warnell ________ 260—484 XR LORRAINE A. WEINBERGER, *Primary Examiner.*

A. P. HALLUIN, *Assistant Examiner.*

U.S. Cl. X.R.

204—158; 260—348, 484, 535, 561

PO-1050
(5/69)

UNITED STATES PATENT OFFICE
CERTIFICATE OF CORRECTION

Patent No. 3,442,942                    Dated May 6, 1969

Inventor(s) DARIO SIANESI, ADOLFO PASETTI, and CONSTANTE CORTI

It is certified that error appears in the above-identified patent and that said Letters Patent are hereby corrected as shown below:

Column 3, line 12, "R-(-M-O-R)$_p$-" should read -- R-(-M-O-)$_p$- --; line 56, "R-(-M-O-R)$_p$-" should read -- R-(-M-O-)$_p$- --. Column 6, line 5, "by using the source" should read -- by using as the source -- . Column 7, line 20, "hydrorepellency" should read -- hydro-repellency --. Column 8, line 26, "Mg" should read -- Hg --. Column 9, line 20, "caracter" should read -- racter --; same line, "ont" should read -- out --. Column 12, Table 1, second heading "G." should read -- g. --; fourth heading "d$_{24}^{24}$" should read -- d$_{24}^{24}$ --. Column 13, line 13, "d$_{24}^{24}$" should read -- d$_{24}^{24}$ --; line 72, "d$_{24}^{24}$" should read -- d$_{24}^{24}$ --. Column 14, line 36, "B" should read -- A --; line 37, "A" should read -- B -- . Column 15, line 16, "C$_3$F$_9$" should read -- C$_3$F$_6$ --; line 61, "26" should read -- 27 --; line 64, "d$_4^{24}$" should read -- d$_4^{24}$ --. Column 16, line 2, "wave length than" should read -- wave length lower than --. Column 19, line 50, "carbooxylic" should read -- carboxylic --. Column 20, line 17, third column heading, "G." should read -- g. --; line 33, "seelcted" should read -- selected --; same line, "grouup" should read -- group -- .

SIGNED AND
SEALED
APR 28 1970

(SEAL)
PR   Attest:

Edward M. Fletcher, Jr.
Attesting Officer

WILLIAM E. SCHUYLER, JR.
Commissioner of Patents